United States Patent
Burgdorf et al.

[11] Patent Number: 6,158,326
[45] Date of Patent: Dec. 12, 2000

[54] UNIT CONSISTING OF AN ELECTRIC MOTOR AND OF A WORKING MACHINE DRIVEN THEREBY

[75] Inventors: Jochen Burgdorf, Offenbach am Main; Heinrich Hofmann, Schweinfurt, both of Germany

[73] Assignees: Continental Teves AG & Co. OHG, Frankfurt; FAG Automobiltechnik AG, Schweinfurt, both of Germany

[21] Appl. No.: 09/242,156

[22] PCT Filed: Jun. 26, 1997

[86] PCT No.: PCT/EP97/03353

§ 371 Date: Sep. 10, 1999

§ 102(e) Date: Sep. 10, 1999

[87] PCT Pub. No.: WO98/06942

PCT Pub. Date: Feb. 19, 1998

[30] Foreign Application Priority Data

Aug. 9, 1996 [DE] Germany ............ 196 32 167

[51] Int. Cl.[7] ...................................... F01B 1/00
[52] U.S. Cl. ................................ 92/72; 417/415
[58] Field of Search ............... 92/72, 140, 128; 417/415, 470, 424.1, 424.2

[56] References Cited

U.S. PATENT DOCUMENTS 5,074,680 12/1991 Hoch et al. .
5,340,285 8/1994 Reinartz et al. .
5,895,207 4/2000 Burgdorf et al. .................. 417/415

FOREIGN PATENT DOCUMENTS

| 0 461 808 | 12/1991 | European Pat. Off. . |
| 0 539 849 | 5/1993 | European Pat. Off. . |
| 0 566 067 | 10/1993 | European Pat. Off. . |
| 295 14 768 U | 12/1995 | Germany . |
| 44 44 644 | 6/1996 | Germany . |

OTHER PUBLICATIONS

Search Report of the Germany Patent Office for German Appl. No. 196 32 167.0.

*Primary Examiner*—Edward K. Look
*Assistant Examiner*—Hermes Rodriguez
*Attorney, Agent, or Firm*—Rader, Fishman & Grauer PLLC

[57] ABSTRACT

In order that in a unit, which consists of an electric motor and a machine driven by the electric motor, a mounting support of the electric motor and the machine which is inexpensive and saves mounting space be achieved by simple means, the drive shaft (4) of the electric motor (1) and the supporting axle (10) of the machine (2) are separately designed and a three-ring bearing (11) including an intermediate eccentric ring (13) is arranged on the supporting axle (10), wherein the intermediate ring (13) is positively and/or operatively connected to the drive shaft (4).

4 Claims, 2 Drawing Sheets

UNIT CONSISTING OF AN ELECTRIC MOTOR AND OF A WORKING MACHINE DRIVEN THEREBY

BACKGROUND OF THE INVENTION

The present invention relates to a unit comprising an electric motor and a machine driven by the electric motor, preferably a piston pump for anti-lock systems of automotive vehicles, for example, wherein the pistons are adapted to be driven by way of an eccentric and the electric motor is adapted to be separated from the machine for trial run purposes.

German patent application No. 43 15 826 discloses a unit of this type. In this application, the housing of the electric motor accommodates a drive shaft in a first bearing and a second bearing at the other end of the housing. The housing of the machine accommodates a third bearing for the drive shaft which, in turn, carries on its eccentric a fourth bearing by which the pistons of the machine are operated. The second bearing with its outside periphery is arranged in the bearing plate of the electric motor but also extends axially into a bore of the housing of the machine when both components are assembled. This construction renders it possible to operate the electric motor independently of the machine for trial run purposes.

However, the above construction suffers from the disadvantage that apart from the large number of bearings and bearing seats and the shaft design which is complicated due to the eccentric, the radially acting reaction forces which originate from the pistons of the machine must be taken up by the second bearing. The second bearing must have corresponding dimensions which necessitates a large mounting space and entails problems with respect to the narrow air gap between the rotor and stator of the electric motor.

Therefore, an object of the present invention is to improve upon a unit of the type mentioned hereinabove so as to permit a low-cost mounting support of the electric motor and the machine in a space-saving manner and by simple means.

SUMMARY OF THE INVENTION

This object is achieved by a unit wherein the drive shaft of the electric motor and the supporting axle of the machine are separate from each other, and a three-ring bearing including an inner ring, an intermediate eccentric ring, and an outer ring is mounted on the supporting axle, wherein the intermediate ring is connected to the drive shaft Due to the separate design of the drive shaft of the electric motor and the supporting axle of the machine, it is possible to conduct the radial forces which originate from the pistons of the machine via the supporting axle directly into the housing of the machine so that the second bearing is isolated from these forces. The drive shaft is devoid of radial load and permits inexpensive manufacture because the eccentric is now formed by the intermediate ring of the three-ring bearing. Because they are not subjected to radial load, the first and second bearings may be designed as friction bearings, calotte-type bearings, or ball bearings of correspondingly small dimensions. The three-ring bearing provides an easy-to-mount and easy-to-handle construction unit. The torque-transmitting sleeve which establishes the connection to the electric motor can also be manufactured as an inexpensive component which, if necessary, may be made of plastics for vibration damping reasons. The need for the torque-transmitting sleeve can also be eliminated by press-fitting the drive shaft directly into the eccentric intermediate ring.

The present invention will be described in detail by way of an embodiment.

DETAILED DESCRIPTION OF THE DRAWINGS

Figure 1:
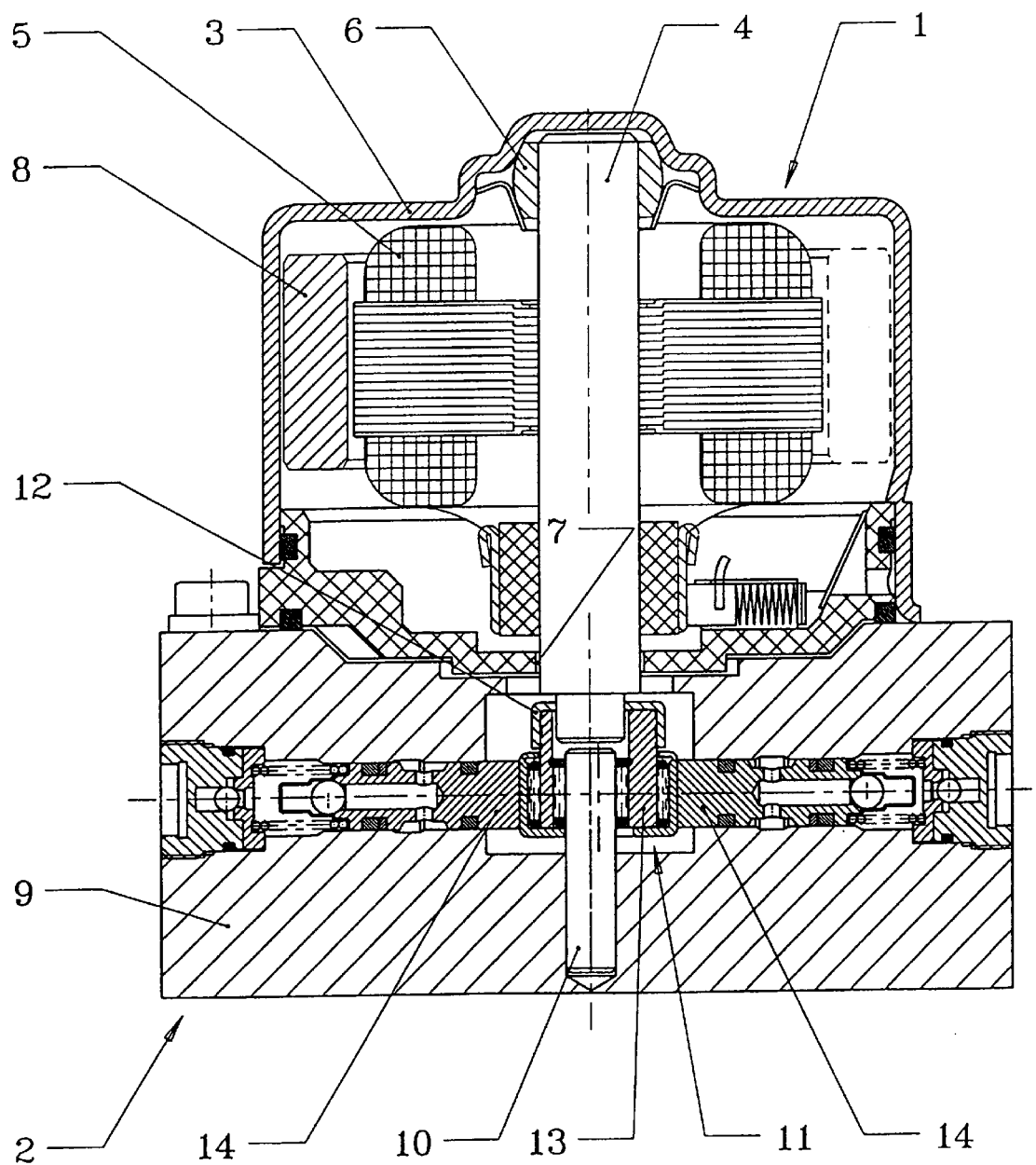
FIG. 1 is a cross-sectional view of a unit according to the present invention.

In the FIG. 1 embodiment, reference numeral 1 designates an electric motor and reference numeral 2 designates a machine. Drive shaft 4 on which rotor 5 is mounted is pivoted in an upper first bearing 6 and a lower second bearing 7 opposite a stator 8 in housing 3 of the electric motor 1. The bearings 6 and 7 in this embodiment are configured as friction bearings and sufficient for the trial run of the electric motor 1 because they need not take up radial forces. Mounted in a housing 9 of the machine 2 is a supporting axle 10 on which a three-ring bearing 11 is fitted. A torque-transmitting sleeve 12 coupled to the drive shaft 4 transmits the torque to an intermediate eccentric ring 13 of the three-ring bearing 11, thereby causing axial reciprocating movements of pistons 14 of the machine and, thus, the development of the pressure which is required for the operation of an anti-lock system, for example. The occurring reaction forces are directed to the supporting axle 10 and, thus, into the housing 9 of the machine 2 by way of outer ring 15 of the three-ring bearing 11 and the needle rows 16 and 17.

Figure 2:
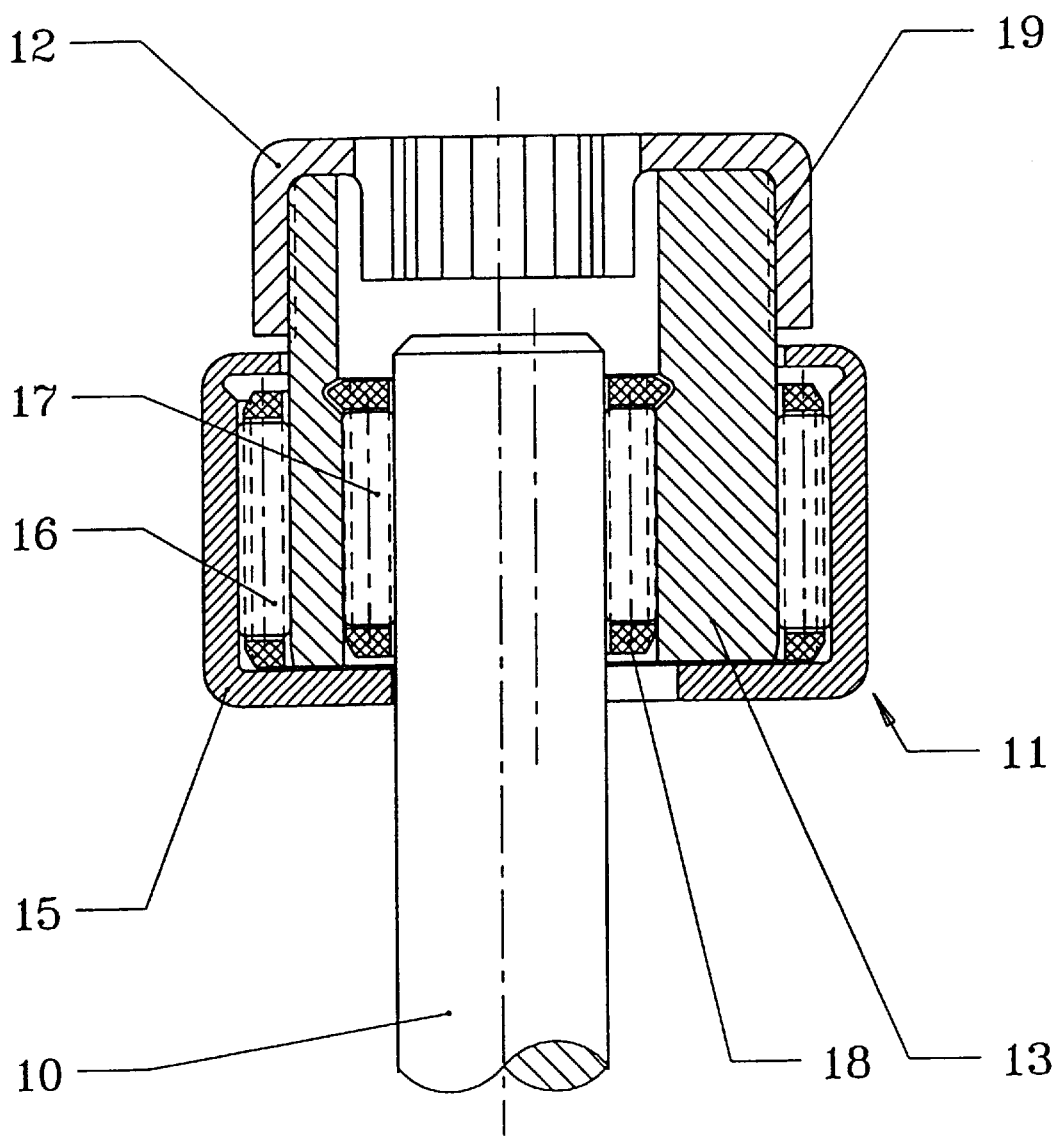
FIG. 2 is an enlarged view of the three-ring bearing with the torque-transmitting sleeve.

As can be seen in the FIG. 2 embodiment, the outer ring 15, the intermediate eccentric ring 13, the needle rows 16 and 17 and, if desired, the torque-transmitting sleeve 12 provide a construction unit which facilitates the handling and assembly. To this effect, the three-ring bearing is protected against the ingress of dirt or the escape of lubricating grease by way of packing washers 18 designed on the cage. The intermediate eccentric ring 13 has wider dimensions than the outer ring and includes in its projecting area that faces the electric motor an external toothing 19 which interacts with the torque-transmitting sleeve 12. Knurls may be provided in lieu of the toothing because the type of connection between the intermediate ring 13 and the drive shaft 4 may be very variable. The use of a three-ring bearing with needles as roll bodies achieves a bearing of radially compact overall dimensions.

What is claimed is:

1. A unit comprising an electric motor and a machine driven by the electric motor, the machine including pistons adapted to be driven by way of an eccentric, and the electric motor being adapted to be separated from the machine for trial run purposes, wherein the electric motor has a drive shaft, and the machine has a supporting axle separate therefrom, and a three-ring bearing including an inner ring, an intermediate eccentric ring, and an outer ring is mounted on the supporting axle, wherein the intermediate ring is connected to the drive shaft.

2. A unit as claimed in claim 1, wherein the three-ring bearing is configured as a needle bearing.

3. A unit as claimed in claim 1, wherein the intermediate ring has wider axial dimensions than the outer ring and an area which projects beyond the outer ring toward the electric motor and which includes an external toothing, and wherein the intermediate ring is adapted to be connected to the drive shaft of the electric motor by way of a torque-transmitting sleeve which includes an internal toothing in its bore.

4. Unit as claimed in claim 3, wherein the torque-transmitting sleeve is connected to the drive shaft by way of a multiplex gear-tooth system.

* * * * *